Feb. 18, 1958    G. SUCETTI    2,824,022
LIGHT WEIGHT WATER RESISTANT AGGREGATE
AND METHOD OF MAKING THE SAME
Filed Feb. 16, 1955
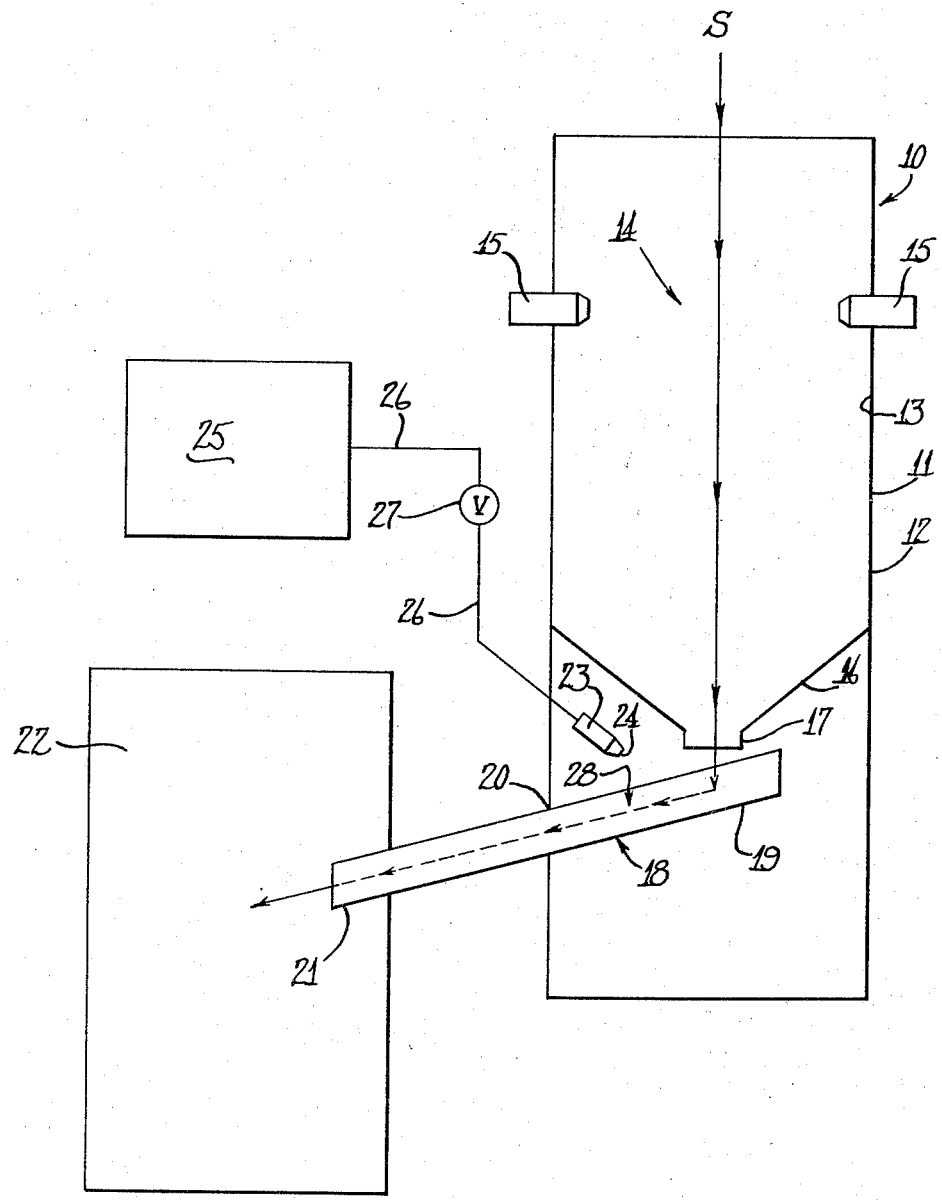
Inventor
Glenn Sucetti United States Patent Office 2,824,022
Patented Feb. 18, 1958

2,824,022

LIGHT WEIGHT WATER RESISTANT AGGREGATE AND METHOD OF MAKING THE SAME

Glenn Sucetti, Grass Valley, Calif., assignor to Zonolite Company, Chicago, Ill., a corporation of Illinois Application February 16, 1955, Serial No. 488,680

6 Claims. (Cl. 117—54)

The present invention relates to a new and improved light weight, water-resistant aggregate and to a method for producing the same.

The present invention is particularly concerned with the treatment of various types of light weight aggregate materials which are commonly used with hydration settable binders, as, for example, in the manufacture of concrete, plaster or the like, and which are also widely employed as a loose fill insulating material. Included among this type of light weight aggregate materials are vermiculite, perlite, "Haydite" (a highly cellular burned argillaceous composition), bloated clays, pumice, and light weight expanded slag. Treatment of all of the above compositions is within the scope of the present invention. The succeeding disclosure, however, will be made in connection with the treatment of vermiculite and perlite since thse two are probably the most important aggregates employed commercial-wise at present.

The characteristics of vermiculite, in its exfoliated or expanded form, and expanded perlite make these materials particularly valuable aggregates for inclusion with hydration settable binders and also as loose insulation fills. Both these aggregate materials, however, have a tremendous internal surface area for a given volume, which allows expanded vermiculite and perlite to absorb as much as 200% to more than 300% of their weight in water capillary absorption.

In relatively humid climates, the water-carrying properties or absorptivity of expanded vermiculite or perlite are not always to be desired. Where the climate has a relatively high humidity, plaster or the like hydration settable materials containing the heat expanded aggregate as a rule, require an unreasonably long drying time due to the presence of excess water absorbed by these light weight aggregate particles. Since the surrounding air usually cannot absorb sufficient amounts of the water contained in the hydration settable composition, a structure produced therefrom tends to remain wet and, as such, tends to be weakened and is not always receptive to paint or the like coating materials.

Light weight aggregates, as a rule, do not absorb moisture vapors from the air. Such aggregates can, however, absorb condensed or liquid water; having indeed a great affinity and capacity for absorbing water in the liquid state.

When employed as loose fill insulation, such as in attic floors, and the like, the liquid water absorbing properties of heat expanded vermiculite and perlite are usually undesirable. This is due primarily to the fact that in cold weather water vapor in the air will often tend to condense in a dead air space. When this occurs a light weight aggregate disposed in such space will absorb the condensed moisture and the individual granules of the aggregate will tend to coalesce or become packed. This packing, along with the increased water content of the granules, decreases or minimizes the insulating ability of the material in that the rate of heat transference therethrough is increased.

Attempts have been made previously to decrease the absorptive nature of light weight aggregates, particularly vermiculite and perlite. To this end expanded vermiculite and perlite have been coated with water-resistant materials, such as asphalt, wax, plastics or the like. The adhesive nature of most suitable water-resistant materials, however, tends to produce a heavily coated aggregate wherein the individual particles often agglomerate into a sticky mass. Coatings of this type are, obviously, not the most desirable for inclusion in a hydration settable mixture, such as plaster or the like, nor do they flow freely enough to be employed effectively as a loose fill for insulation purposes.

A procedure wherein the particles are coated while suspended in a heated gas has, until now, proved the most satisfactory method for coating expanded light weight aggregates. This procedure, however, is not without its limitations. The equipment required to provide a suitable gas suspension and an atomized fog of the water-resistant material is cumbersome and space-consuming in addition to being expensive. Further, the receptacle or chamber in which gas suspension of the aggregate particles is effected during coating not uncommonly accumulates an excessive deposit of the usually adhesive-like water-resistant material of the inner surfaces of the chamber walls. This condition, in some instances, leads to a clogging of the machine necessitating frequent cleaning.

In accordance with the general features of the instant invention there is now provided a new and improved, simple and inexpensive method for coating light weight aggregate particles or granules in which an aggregate material, such as vermiculite or perlite, is first exfoliated or heat expanded by passing granules of the material through an expanding zone at elevated temperatures. The aggregate is then contemporaneously formed into a bed and cooled to a temperature below that employed in heat expansion but to one which is sufficiently high to volatilize water. Thereafter an aqueous emulsion of a suitable water-resistant material is applied to the bed which, upon making contact with the heated granules, has the water contained therein rapidly vaporized or converted to steam by the sensible heat of the granules. This in turn effects a steam dispersion of the water-resistant material throughout the entire bed thereby to coat each and every particle therein with a continuous, uniformly thin film of the water-resistant material and in which the film is only microns in thickness.

It is, therefore, an object of this invention to provide a new and improved light weight insulating aggregate material comprising discrete particles of a heat expanded light weight aggregate having a continuous, thin film of a water-resistant material of micron thickness deposited on each of the particles to decrease the moisture absorptivity thereof.

Another object is the provision of a light weight water-resistant aggregate material comprising discrete particles of a heat expanded light weight aggregate having a continuous, uniformly thin film of a water-resistant bituminous material of less than about 10 microns in thickness deposited on each of the particles to decrease the capillary moisture uptake thereof to less than about 10 to 20% by weight of the particles.

Still another object is the provision of a method for producing a novel light weight water-resistant aggregate wherein a moving bed of heat expanded light weight aggregate granules is provided having a temperature sufficient to volatilize water and in which an aqueous emulsion of a suitable water-resistant material is applied to the bed causing the water of the emulsion to become volatilized or converted to steam upon contact therewith to effect a steam dispersion of the water-resistant material throughout the entire depth of the bed at the point of emulsion application thereby to coat each and every aggregate granule at and adjacent the point of application with a continuous uniformly thin film of the water-resistant material and in which the film is only microns in thickness.

Yet another object is the provision of a method for producing a novel light weight water-resistant aggregate material in the form of discrete particles in which light weight aggregate granules are subjected to heat expansion at elevated temperatures after which the granules are contemporaneously formed into a bed, cooled to a temperature less than expansion temperatures but in excess of 212° F. after which an aqueous bituminous emulsion is applied to the bed which, upon making contact with the heated granules, has the water contained therein rapidly converted to steam to effect a steam dispersion of the bituminous material throughout the bed thereby to coat each and every aggregate granule at and adjacent the point of emulsion application with a continuous uniformly thin film of the bituminous material and in which the thickness of the film is usually less than about 10 microns in dimension.

Other objects, features and advantages of the present invention will be readily apparent from the following detailed description of a preferred embodiment thereof taken in conjunction with the accompanying sheet of drawings.

In the drawings:

The accompanying sheet of drawings illustrates, in a diagrammatical manner, a cross-sectional view of a more or less conventional furnace used in expanding light weight aggregates and the manner in which it may be adapted for practicing the preferred method of the instant invention.

As shown in the drawings:

By way of illustration the method of the instant invention is shown as practiced in conjunction with a furnace shown generally at 10. The furnace 10, as shown, is of the generally vertical type which is most widely employed commercial-wise for use in the heat expansion of light weight aggregates such as vermiculite and perlite. The furnace 10 has, as its component parts, a hollow body portion 11 formed of a suitable refractory material, such as fire brick or the like, which provides a side wall portion 12 defining an elongated chamber 13 therein. The upper portion of the chamber 13 comprises a heat expansion or exfoliation zone shown generally at 14. Although the furnace 10 is shown as being of the gravity type it will be apparent that various other forms may also be employed.

Means for developing aggregate expanding temperatures within the expansion zone 14 are provided in the form of suitable opposed burners 15 disposed in the furnace wall 12 adjacent the upper marginal portion thereof. The burners 15 are connected to a suitable fuel supply (not shown).

Means for discharging expanded aggregate particles or granules from the furnace 10 are provided in the lower portion of the furnace. Such means include a generally downwardly, inwardly tapered collecting cone or funnel 16. The downwardly tapered wall of the collecting funnel 16 converges into a generally restricted discharge throat portion 17 which feeds expanded light weight aggregate particles into a downwardly inclined generally U-shaped trough or chute 18.

The upper or aggregate-receiving end portion of the chute 18, as at 19, is disposed interiorly of the furnace 10 and is positioned directly beneath the discharge throat 17 of the collecting funnel 16. The chute 18 is adapted to project laterally downwardly and outwardly from the furnace through the furnace wall 12 as at 20. The lower or delivery end portion of the chute 18 as at 21 projects exteriorly from the furnace 10 and preferably is disposed in open discharge relation within the interior of a suitable receptacle 22 for storing expanded aggregate granules, such as an elevator, silo, bin or the like which if desired may be provided with a suitable bagging apparatus.

Under standard operating procedures the burners 15 are supplied with a suitable fuel which operates to develop aggregate expanding temperatures within the expansion zone 14. Such expanding temperatures are usually in excess of 1000° F., and most often lie in a range of from about 1500° F. to about 2100° F.

Particles or granules of a suitable light weight aggregate material, such as vermiculite or perlite, are introduced into the top of the furnace 10 from a suitable source of supply S and the granules allowed to descend through the expansion zone 14 under the influence of gravity, as indicated by the arrowed-line in the drawings.

During the downward passage of the aggregate particles through the expansion zone 14 the particles quickly assume the increased temperatures of the heated environment in the expansion zone which causes them to expand and increase their volume considerably in a manner well-known in the art.

As shown by the arrows, the downwardly moving aggregate particles, having thus been expanded during downward passage through the expansion zone 14, then gravitate to the bottom of the furnace 10 and come to rest upon the collecting funnel 16.

Under the influence of gravity the expanded aggregate particles slide down the inner surface of the tapered wall of the collecting funnel 16 and are discharged via the throat 17 into the chute 18. The expanded aggregate particles in the chute 18 gravitationally cascade down the inclined chute in the form of a moving bed and are discharged externally of the furnace 10 from the open end portion 21 of the chute 18 into the storage receptacle 22.

In accordance with the instant invention means are provided in association with the furnace 10 for coating the individual light weight aggregate particles subsequent to expansion with a continuous, uniformly thin film of a water-resistant material in which the film is only microns in thickness and in which the aggregate is discharged from the chute 18 as discrete, non-adhesive, free flowing granules or particles. As shown more or less diagrammatically in the drawings, such means include a spray nozzle 23 which may, if desired, be disposed preferably interiorly of the furnace 10 and having the open discharge end portion thereof, as at 24, in spaced relation to the expanded aggregate particle bed being moved down the chute 18 under the force of gravity.

The spray nozzle 23 is in communication with a source 25 of a suitable aqueous emulsion of a water-resistant material, via a conduit or pipe 26. Flow rate of the emulsion from the source 25 to the nozzle 23 is controlled by a suitable valve 27 interposed in the pipe 26.

The expanded aggregate particles discharged from the collecting funnel 16 assume the form of a moving bed of granules as they pass down the chute 18. The granules, which were initially heated to a temperature in excess of 1000° F. during expansion, become cooled relatively rapidly during collection in the funnel 16 and particularly while being discharged into the chute 18.

During this contemporaneous formation of the moving bed in the chute 18 and the cooling of the expanded granules, the temperature of the granules is reduced substantially below those encountered in the expansion zone 14. The temperature of the individual granules in the downwardly moving bed, however, is such that the sensible heat retained by the granules is sufficiently high to vaporize water. That is, the temperature of the granules in the bed is substantially in excess of 212° F. In most commercial expanding processes the temperature of the aggregate bed in the chute ranges from between about 300° F. to about 1300° F., and, as a rule, has a temperature of from about 600° F. to about 800° F.; with the mean temperature of the expanded granules being about 700° F. These temperatures, particularly 600° F. to about 800° F., are preferred in practicing the method of the instant invention, although substantially any temperature sufficient to volatilize water without thermally decomposing the water-resistant material may be employed.

In accordance with the instant method the expanded aggregate granules flowing down the chute 18 in the form of a moving bed, are subjected, adjacent the discharge throat 17, to treatment with an aqueous emulsion of a water-resistant material. This coating treatment is preferably effected by applying the emulsion to the bed of granules in the form of a continuous spray or series of continuous fine streams by means of the spray nozzle 23. When the aqueous emulsion of the water-resistant material discharged from the spray nozzle 23 contacts the top surface of the heated moving bed the sensible heat of the individual expanded granules causes the water contained in the emulsion to be converted rapidly to steam. The rapid expansive vaporization of the water results in a steam dispersion of the water-resistant material throughout the entire depth of the bed at and immediately adjacent the point of emulsion application.

This simple but uniquely produced rapid and continuous steam dispersion of the water-resistant material throughout the entire moving bed, from top to bottom results in the deposition of a continuous, uniformly thin film of the water-resistant material on each and every granule or particle in the bed. The film thus formed on the granules is substantially only microns in thickness, with the dimension of the film being usually less than about 10 microns. This thin film is more or less vapor-permeable but impervious to liquids. Accordingly, any moisture absorbed by the granules during the coating treatment is rapidly driven off through the film in the form of steam.

I have found that the coated granules are substantially equal in weight to those of non-treated particles, which clearly indicates the extremely thin nature of the film; the film merely appearing to the unaided eye as a slight discoloration on the surface of the particle. This film, however, is sufficiently thick to prevent capillary absorption of water by the particle.

The water-resistant film produced by the instant method reduces the moisture absorptivity or capillary water uptake capacity of the individual granules to from about less than 10 to 20% by weight, and in most instances the moisture absorptivity is decreased to less than 10%. That this is a significant decrease in capillary water uptake capacity is clearly indicated by the fact that non-coated particles of the exfoliated or heat expanded aggregate, such as vermiculite or perlite, normally will absorb upwards in excess of 300% water by weight.

In addition to being water-resistant the micron thin films produced by the present method are non-adhesive in character and, accordingly, expanded aggregate granules thus coated remain as discrete particles and do not agglomerate or coalesce into sticky masses as opposed to particles coated in accordance with previously known methods. The instant water-resistant films are sufficiently thin and non-adhesive in character such that fines are not agglomerated by this process, but rather are merely coated with the instant thin film and remain as discrete particles as do the larger granules.

The size of the moving bed of expanded aggregate particles in the chute 18 may vary depending upon the size of the furnace employed; the rate at which expanded granules are discharged into the chute; the temperature of the granules; the size of the chute itself; the rate at which the emulsion is delivered from the spray nozzle; and, similar structural and environmental considerations which may fluctuate from one expansion unit to another and within the same unit under various conditions. In general, however, the downwardly moving bed of aggregate particles in the chute 18 should have a depth which allows a uniform and rapid steam dispersion of the water-resistant material throughout the entire bed at a particular temperature so as to coat each and every granule with a continuous, uniformly thin film as described.

Although I have not encountered any substantial limitation on the depth of the moving bed, I have found that best results may be obtained when the width of the bed is approximately about two to four times greater than the depth and in which the emulsion spray is discharged so as to transversely contact approximately one half to two thirds of the top surface of the bed as it passes through the spray in its passage down the inclined discharge chute. As will be appreciated, however, such considerations touching on the relative width and depth of the bed within the chute are given merely by way of illustration and, as noted previously, may vary within wide limits for any individual requirement.

The water-resistant materials which may be employed in coating expanded aggregate particles in accordance with the method of this invention include preferably bituminous materials such as asphalt. It will be appreciated, however, that any number of various suitable water-resistant materials may be employed. I prefer, however, to use an asphalt emulsion dispersed in water, and containing a stabilizing medium such as a saponified "Vinsol" resin of the type described in my Patent No. 2,354,156, issued July 18, 1944.

The "Vinsol" resin is a mixture of resinous material, and is recovered as a black residue after the extraction of rosin with petroleum solvents. In the usual process for the recovery of this resin, pine wood is extracted with a hydrocarbon solvent such as benzene to extract materials such as turpentine, pine oil, rosin, and the residue previously mentioned. Subsequently, the turpentine and the pine oil are distilled off and the remaining materials are extracted with a petroleum derivative such as petroleum ether. After the removal of excess solvent, the dark colored resinous substance is recovered. The material has a melting point of from about 115° to 125° C. and an acid number of about 100.

The resin described can be saponified by treatment with a solution of sodium hydroxide, potassium hydroxide or a similar base, as described more particularly in U. S. Patent No. 2,199,206.

The proportions of the bituminous constituents in the aqueous asphalt emulsion will vary depending upon the degree of water-proofing to be achieved by the coating of expanded aggregate particles. The following composition has been found to decrease the water absorption properties of exfoliated vermiculite from a value in excess of 300% to a value of about less than 10 to 20% by weight of the particle thus coated when employed in amounts of less than 1% of dried asphalt material by weight of aggregate:

TABLE I 55 parts by weight of 50–60 penetration asphalt from California crude petroleum
43.35 parts hot water
0.15 part caustic soda
1.5 parts saponified "Vinsol" resin The above emulsion is diluted with from about 2 to 6 parts of water prior to being sprayed from the spray nozzle 23 onto the moving bed of expanded aggregate granules. One gallon of the diluted emulsion described in Table I can be used to treat from 20 to 60 cubic feet of vermiculite, depending upon the degree of dilution prior to spraying and the decrease of moisture absorptivity desired.

The amount of the water-resistant material which is deposited upon the expanded granules by the instant method may vary according to individual needs. In practice, however, I have found that usually only less than about 1% by weight of the dry water-resistant material, such as asphalt, need be deposited on the aggregate particles. For example, exfoliated vermiculite, which has a density of approximately 9 pounds per cubic foot, may be efficiently coated by the method of the instant invention so that approximately 1 pound of exfoliated vermiculite will carry approximately 0.01 lb. of asphalt solids, or less than 1% by weight and still have capillary water uptake of the granules reduced to 10% or less by weight.

The following detailed example, given by way of illustration only and not by way of limitation, more clearly describes the operational features of the instant method:

*Example*

A commercially available spray nozzle, similar to those used in road construction work, was mounted within a conventional upright vermiculite expanding furnace. The discharge end of the nozzle was positioned so that it was in relatively close spaced relation to the discharge chute approximately 3 to 6 inches from the furnace outlet.

The discharge chute leading from the furnace was approximately 8 inches in width and the rate of delivery of the expanded aggregate into the chute was adjusted so as to produce a moving bed of expanded granules within the chute having a width of 8 inches and a depth of approximately 3 inches.

Approximately 90 tons of non-exfoliated vermiculite ore particles were continuously fed into the top of the furnace and allowed to gravitate through the expansion zone to become exfoliated. The expanded vermiculite was then fed into the discharge chute to form a downwardly moving bed having a temperature of about 700° F.

450 gallons of the emulsion disclosed in Table I were mixed with 900 gallons of water giving a 1:3 dilution. 18,460 cubic feet of the heat expanded vermiculite at 700° F., being discharged as a moving bed were spray treated with the diluted emulsion in the manner disclosed.

The results of this coating run are as follows:

(1) The treated granules, less than one minute after being sprayed, were found to weigh substantially the same as untreated granules.

(2) The sensible heat of the treated granules had driven off all free water contained therein.

(3) Capillary water pick-up of the treated granules was reduced to about 10% by weight as compared to 280% by weight for the untreated samples which were made throughout the run.

(4) The granules thus coated were discrete particles and there was no tendency toward adhesion due to the film formed thereon.

Inasmuch as the emulsion prior to dilution was substantially half water, there were only about 225 gallons of asphalt solids used, or about 30 cubic feet to film 18,460 cubic feet of the exfoliated vermiculite. This is the equivalent of about 0.09 lb. of asphalt for each cubic foot of the aggregate. Since expanded vermiculite weighs about 9 pounds per cubic foot this results in a coating of asphalt of approximately 1% by weight of the granules.

By means of the instant method it is now possible to water-proof expanded light weight aggregate materials in a manner which is more efficient, much simpler and less expensive than methods which have been proposed heretofore. As opposed to the rather cumbersome, expensive machines employed hitherto, the method of the instant invention merely employs an inexpensive, simple spray nozzle substantially of the type used on garden hoses, in conjunction with presently existing equipment. Since the aqueous bituminous emulsion is applied as a liquid as opposed to being atomized as done previously, there is no need to employ expensive type nozzles as are usually required to develop atomization of an emulsion.

In addition, the method of the instant invention produces discrete particles having water-proof films thereon which are non-adhesive and of extremely thin dimensions. Since the films produced on the granules by the instant method are thin and non-adhesive in character the possibilities of the discharge chute or other equipment becoming clogged by a coalescence of the granules is reduced to a negligible minimum if not completely eliminated. Accordingly, the troublesome limitation of machine clogging as was present in some methods used heretofore has been successfully avoided.

From the foregoing, it will be appreciated that the present invention provides a simple, inexpensive and convenient method for water-proofing aggregate particles in such a manner that the individual granules are provided with a film of micron thickness which is vapor permeable but impervious to the passage of water and in which the individual granules are recovered as discrete particles.

It will also be apparent that the means, in the form of a spray nozzle employed in practicing the instant invention is not only inexpensive, but also may be used in conjunction with existing standard equipment in this art; requiring only a simple installation and a minimum of upkeep.

It will be understood that modifications and variations may be effected without departing from the scope of the novel concepts of the present invention.

I claim as my invention:

1. A method for producing a light weight water-resistant aggregate, which comprises providing a bed of heat expanded light weight aggregate particles having a temperature of from about 300° to about 2100° F., and applying to said bed while the particles therein are within said temperature range an aqueous dispersion of a normally solid water-resistant material that is thermoplastic and flowable at temperatures within said temperature range, said dispersion being applied in a liquid state sufficiently dilute and in sufficient proportions that the water contained therein is volatilized by the sensible heat of said particles to effect a steam dispersion of said water-resistant material throughout said bed and each particle therein is coated with a continuous uniformly thin film of said water-resistant material of a thickness less than about 10 microns to produce non-coalescing particles having a substantially reduced capillary water uptake capacity.

2. The method of claim 1 in which the water-resistant material is asphalt and is applied as an aqueous emulsion.

3. The method of claim 1 in which the light weight aggregate is heat-expanded vermiculite.

4. The method of claim 1 in which the light weight aggregate is heat-expanded perlite.

5. The method of claim 1 in which the light weight aggregate is heat-exfoliated vermiculite which is cooled from the temperature at which the vermiculite is heat-exfoliated to a lower temperature within the range of about 600 to about 800° F. and in which asphalt is the water-resistant material and is applied as an aqueous emulsion.

6. An aggregate composition obtained by the method defined by claim 1.

References Cited in the file of this patent

UNITED STATES PATENTS

| | | |
|---|---|---|
| 1,911,808 | Collins | May 30, 1933 |
| 1,972,390 | Miner | Sept. 4, 1934 |
| 2,420,368 | Giordano | May 13, 1947 |
| 2,625,512 | Powell | Jan. 13, 1953 |
| 2,639,269 | Dube | May 19, 1953 |
| 2,650,171 | Schaaf | Aug. 25, 1953 |
| 2,663,323 | Tyomas | Dec. 22, 1953 |

FOREIGN PATENTS

| | | |
|---|---|---|
| 24,809/35 | Australia | Nov. 10, 1936 |